Dec. 10, 1940.    N. GRIMALDI    2,224,343
SWIVEL CONNECTION
Filed Feb. 15, 1940
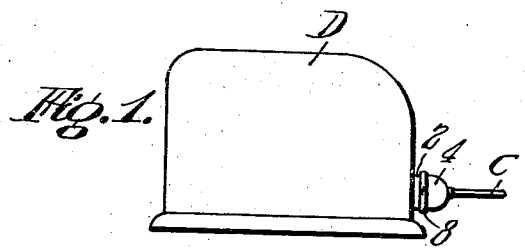
Fig. 1.
Fig. 2.
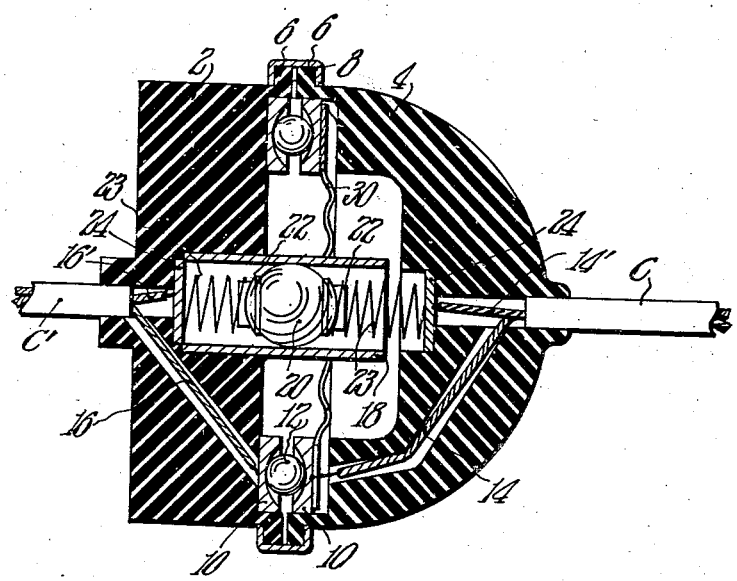
Fig. 3.
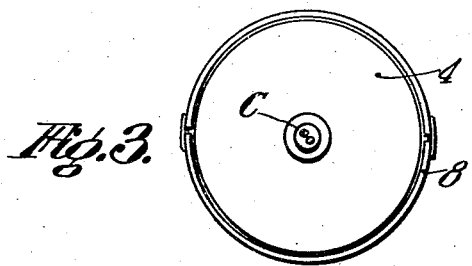
INVENTOR.
Nicholas Grimaldi.
BY Walter C. Ross, Attorney Patented Dec. 10, 1940

2,224,343

UNITED STATES PATENT OFFICE 2,224,343

SWIVEL CONNECTION

Nicholas Grimaldi, Springfield, Mass.

Application February 15, 1940, Serial No. 319,109

1 Claim. (Cl. 173—324)

This invention relates to improvements in electric connections and is directed more particularly to an improved swivel connection for use in electric light and other cords.

It is a principal object of the invention to provide a swivel connection so constructed as to absolutely eliminate objectionable twisting and kinking and consequent breaking of the wires. As will appear, the connection is especially adapted to be built into an electric device, such as a toaster, iron, or the like, as an integral part thereof.

A further object of the invention is the provision of a novel swivel-switch connection which is simple in form so as to be economical in manufacture. The connector is characterized by two half-parts, one of which at least is capable of free rotation relative to the other continually in either direction without breaking the wires.

Various other novel features and advantages of the invention will be hereinafter more fully referred to in connection with the accompanying description of the invention, in the present preferred form thereof, reference being had to the accompanying drawing wherein:

Fig. 1 is a side-elevational view showing an electric toaster having the device of the invention associated therewith;

Fig. 2 is a sectional view through the device of the invention; and

Fig. 3 is an end elevational view of the device of the invention.

Referring now to the drawing more in detail, the invention will be fully described.

There are two half-parts 2 and 4 held against separation in some suitable manner. In one way the parts 2 and 4 may be formed to have upraised portions 6 at adjacent peripheral edges so that marginal flanges of a ring 8 may engage the same, as shown.

According to the preferred form of the invention one of the half-parts such as 2 is carried by or built into an electric device D, such as a toaster shown for purposes of description, while the other part 4 has an electric cord C extending thereinto. It is to be understood, however, that the connector of the invention is adapted to be located between two lengths of cord C, that is with a cord entering each half part thereof.

The inner face of each half-part is provided with an annular grooved ball-race 10 and these carry a series of anti-friction balls 12 to facilitate free relative rotation of the parts. A wire 14 of cord C has its inner end connected to the ball-race 10 of part 4 while a wire 16 of the electric device has its inner end connected to the ball-race 10 of part 2.

There is a tube 18 within a hollow space between the body parts and within the tube is a ball 20 preferably having washers 22 at opposite sides thereof. Springs 23 extend between outer faces of said washers 22 and other washers 24, one each of said washers 24 being seated in each half-part of the switch body.

Another wire 16' leading from the electric device D is connected to the washer 24 in part 2 while a wire 14' of cord C is connected to the washer 24 in part 4. With the wires thus connected to the various members described it will be seen that the electrical connection is made, it being understood, of course, that the cord C connects with a source of electrical energy.

The wires may be fastened to the metallic washers and races in any suitable way, as by soldering. It will be appreciated that the swivel members protect the wires and spring and one of the half-parts, at least, may be rotated relative to the other in either direction through as many complete revolutions as desired without straining or breaking the wires.

The tension of the springs 23 against the washers 22 and 24 guarantees desired confinement of ball 20 as well as proper electrical connection at all times. The said springs 23 may, of course, take any desired form and are shown as coil springs only for purposes of disclosure.

There may be a spring or springs such as 30 within one of the half-parts for yieldingly urging the ball races 10 into such relation as will assure most efficient action of the balls 12. The various parts are all so arranged that there is free swiveling when desired and proper electrical contact.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

A swivel connection device of the class described comprising in combination, a pair of adjacently-disposed unitary half-parts relatively rotatable on aligned axes, each of said half-parts being provided on its inner peripheral edge with an outwardly-extending flange, a ring member extending around said half-parts and provided with spaced flanges extending inwardly from opposite side marginal edges thereof embracing said flanges of the half-parts so as to hold the same against axial separation but permit their relative rotation, each of said half-parts being provided with a recess in its inner face so as to provide a hollow space within the device, a hollow unitary tube extending between said half-parts in a plane at least parallel with the axis of rotation thereof with its opposite end portions disposed in said recesses, a circular ball-race formed in the inner adjacent faces of said half-parts and extending around the outside of said tube in a plane transversely of the axis of rotation of the half-parts, a ball-bearing in said ball-race, a separate unitary metallic disc in each of said recesses, one being disposed adjacent each end of said tube, an electric cord extending into each of said half-parts and each including a pair of wires, the inner ends of the wires of one pair being connected respectively to one disc and said ball race and the inner ends of the wires of the other pair being connected respectively to the other disc and said ball race, a metallic ball member confined within said tube, and separate springs within said tube yieldingly bearing against opposite sides of said ball member, one spring extending between one side of said ball member and said one disc and the other spring extending between the opposite side of said ball member and said other disc.

NICHOLAS GRIMALDI.